April 9, 1968     J. BENEZECH     3,377,486

MAGNETO-TYPE POWER SUPPLY FOR VEHICULAR LIGHTING SYSTEM

Filed Dec. 7, 1964

Jacques Benezech
INVENTOR

Karl F. Ross
AGENT

United States Patent Office 3,377,486
Patented Apr. 9, 1968

3,377,486
MAGNETO-TYPE POWER SUPPLY FOR VEHICULAR LIGHTING SYSTEM
Jacques Benezech, Le Vesinet, France, assignor to Société anonyme dite: Novi-P.B., Pantin, France, a corporation of France
Filed Dec. 7, 1964, Ser. No. 416,498
Claims priority, application France, Sept. 24, 1964, 989,176, Patent 1,416,537
2 Claims. (Cl. 307—10)

ABSTRACT OF THE DISCLOSURE

Vehicular lighting system with flywheel magneto supplying current to ignition system and to lighting circuits, the latter including a stop light, wherein the usual armature windings for the ignition and light circuits are supplemented by a split winding having its two sections connected in series-aiding relationship for the energization of the stop light, one of these sections being also connected in series-aiding relationship with the energizing winding for the light circuits whereby part of the power available for energization of the stop light during daytime driving will be supplied to the headlight at night, with concurrent dimming of the normally overdriven stop light.

---

This invention relates in general to magneto flywheels and has specific reference to an improved magneto flywheel intended primarily for supplying electric current to a vehicle such as a light-weight motorcycle or a motor-assisted bicycle equipped with an ignition system, a main lighting system and various auxiliary electric circuits for the momentary energization of driver-controlled devices such as a horn, a warning (i.e. stop) light, directional or traffic signal lamps, and/or a battery-charging device for feeding a parking lamp, a continuous stop light, a continuous flash light, etc.

It is known that the multiplicity of electric load circuits is a cause of many problems some of which are quite difficult to solve. Owing to the E.M.F. developed by the source of power or generator, there is a constant risk of burning out light bulbs and, if one of them fails, the others will receive the maximum power available. To avoid this drawback, magneto flywheels having double armatures have been constructed, one armature supplying current for the headlamp and the other energizing the tail lamp.

With certain power sources, notably those of relatively high power, stronger magnets are used whose voltage characteristics as a function of the velocity of rotation of the flywheel are such that the risk of burning out a bulb as a consequence of a faulty operation of another bulb appears only at relative high r.p.m. values. In this case the double-armature solution mentioned hereinabove is no longer necessary.

If the aforesaid auxiliary circuits such as horn, stop light, direction signal lamps, etc. are made compulsory by official regulations or the Highway Code, a relatively great power output is necessary, as already explained hereinabove.

However, if for example the horn circuit is inserted in the lighting circuit the sound signal obtained by day will be adequate but by night it will be scarcely audible on account of the considerable power absorbed by the bulbs; therefore, a logical solution would consist in this case in providing an additional coil in the magneto flywheel.

Regarding directional signal lamps (or "trafficators") it was determined in several countries that they were more dangerous than useful and the present trend is to omit them completely on two-wheeled vehicles.

As to the stop light, by far the most important auxiliary circuit, a relatively high main power output is also necessary. But if the corresponding bulb is fully energized by day it should be weaker by night in order to avoid dazzling following drivers. Under these conditions, the insertion of a resistance in series with the tail lamp is required.

Therefore, the ideal solution consists, according to this invention, in leaving the lighting and ignition circuits unchanged and providing a special armature for all the above-mentioned auxiliary circuits, this extra armature being separate from the ignition and lighting armatures.

Unfortunately, the presence of a third, special armature will change the performance of the other two armatures by reason of the distribution of the lines of force of the magnetic flux among the three armatures. Whereas in relatively powerful magneto flywheels (for example 28-watt generators) it is of no consequence to reduce the flux in the ignition armature, this reduction tends to impair the effectiveness of the lighting circuit.

In view of these conditions the present invention consists basically in combining a special armature, associated with the auxiliary circuits, with the lighting circuit so that the influence exerted by the third armature during the operation of the vehicle has but a negligible effect on the lighting-circuit armature.

More particularly, according to this invention by day, when the lighting system is not used, the maximum power output is supplied to the auxiliary circuits and by night, when the lighting system is switched on, the luminous intensity of this system is not reduced in spite of the operation of the auxiliary circuits, owing to the fact that one fraction of the current delivered by the special armature is fed to the lighting system, which thus will draw from the third armature enough power to make up any loss due to the operation of said auxiliary circuits.

An additional advantageous feature is obtained with this arrangement, notabaly in connection with the stop light. Thus, by day this bulb will be constantly subject to full energization whereas by night the power taken therefrom and fed to the lighting circuit will prevent the stop light from dazzling following drivers, which is one of the objects contemplated by my present improvement.

Therefore, a magneto flywheel according to this invention is characterized essentially in that it comprises, in addition to the exciting or ignition armature and the lighting armature, a third special armature adapted to feed the auxiliary circuits, the winding of this third armature being divided into two sections which deliver current in series to said auxiliary circuits when the lighting circuit is not in service, one of said sections being connected in series with the winding of said lighting armature when the lighting circuit is in service.

According to a specific and particularly advantageous embodiment of this invention, the third armature winding is wound on a magnetic core having a pair of pole shoes registering, respectively, with one of the pole shoes of the lighting-armature core and with one of the pole shoes of the core of the exciting or ignition armature.

Other features and advantages of this invention will appear as the following description proceeds with reference to the accompanying drawing illustrating diagrammatically, by way of example, a typical embodiment of the invention and of the manner in which the same may be carried out in practice. In the drawing.

Figure 1:
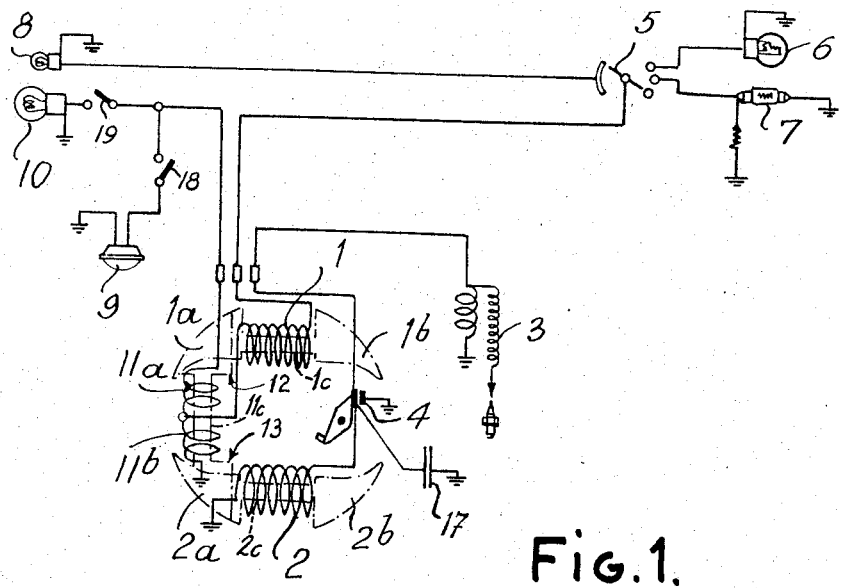
FIG. 1 is a wiring diagram showing the magneto flywheel according to this invention connected to the lighting and ignition circuits, on the one hand, and to the auxiliary circuits of the horn and the stop light, on the other hand.

In the embodiment illustrated in the drawing the assembly comprises the armature winding 1 of the lighting circuit, the winding 2 for exciting the high-voltage ignition coil 3, the pole shoes 1a and 1b of the laminated core 1c of the lighting armature, and the pole shoes 2a and 2b of the laminated core 2c of the exciting armature.

The exciting-armature winding 2 delivers current to the high-voltage coil 3 through a circuit breaker 4 and the lighting-armature winding 1 delivers current through the intermediary of a rotary or like switch 5 either to the headlamp bulb 6 (which may be a two-filament bulb) or to the small or low-wattage bulb 7, as well as to the tail lamp 8. The horn 9 and the stop light 10 constitute an auxiliary circuit which also includes the usual driver-operated switches 18, 19 for their respective operation.

According to this invention, the horn 9 and the stop light 10 are connected to the winding 11a, 11b of a third, special armature whose laminated core 11c, disposed at right angles to the laminated cores 1c and 2c, terminates in a pair of pole shoes 12 and 13 lying flat on corresponding pole shoes 1a and 2a of armatures 1 and 2, respectively.

Figure 2:
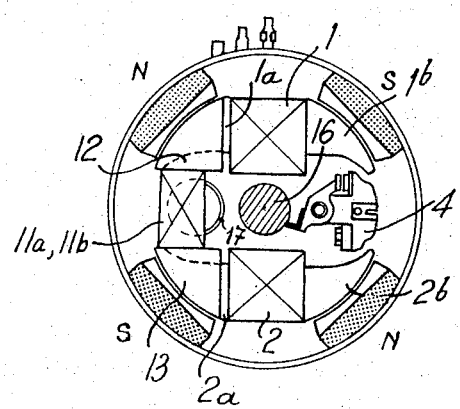
FIG. 2 is a plan view from above, showing the interior of the magneto flywheel.
Figure 3:
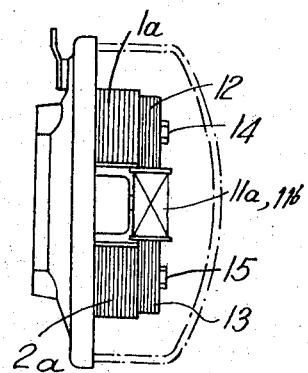
FIG. 3 is a side view of the flywheel of FIG. 2.

Thus, in effect, the three armatures have only four exposed pole pieces so as to be able to cooperate with a four pole instead of a six-poled flywheel. The polarities of the four peripherally spaced magnetic poles have been indicated by the letters N (north) and S (south) in FIG. 2. A single bolt 14 (FIG. 3) is used for assembling the overlapping pole shoes 12 and 1a, and another single bolt 15 is used for assembling the overlapping pole shoes 13 and 2a.

As shown more particularly in FIG. 1, the lower winding section 11b of the supplemental armature is grounded and is further connected in series-aiding relationship on the one hand, with the winding section 11a delivering current to the auxiliary circuits and, on the other hand, with the lighting armature winding 1.

It is obvious that by day, i.e. when the lighting circuit is open, the two winding sections 11a and 11b will deliver current simultaneously and in series-aiding relationship to the auxiliary circuits 9, 18 and 10, 19 which are thus slightly overdriven.

By night, on the other hand, with switch 5 operated to energize headlight 6, part of the current delivered by winding 11a, 11b is fed to the lighting armature 1 whereby the lighting circuit will draw from the special armature enough power to compensate for the energy which would otherwise be drained from this lighting circuit upon closure of switch 18 or 19, whereas the voltage of the auxiliary circuits, notably the stop-light circuit, is reduced so that the stop lamp is dimmed at night.

The reference numeral 16 designates the cam operating the interrupter 4, 17 being the capacitor of the magneto flywheel.

Of course, it would not constitute a departure from the present invention to make various modifications and variations in the practical embodiment of this invention. Thus, notably, the high-voltage coil could be housed within the magneto flywheel without departing from the spirit and scope of the invention.

What I claim is:

1. A vehicular power supply comprising a normally open main lighting circuit including first switch means for the closure thereof, first armature means with a first winding thereon for the energization of said main lighting circuit, an auxiliary circuit including second switch means for the momentary operation of a warning light, second armature means with a second winding thereon for the energization of said auxiliary circuit, and magnetic means displaceable relatively to said first and second armature means for inducing a voltage in said windings, said second winding being split into two sections connected in series-aiding relationship for fully energizing said warning light upon closure of said second switch means in the open condition of said first switch means, one of said sections being further connected in series-aiding relationship with said first winding whereby energization of said warning light is reduced upon simultaneous closure of said first and second switch means.

2. A power supply as defined in claim 1 wherein said magnetic means comprises a flywheel provided with four peripherally spaced magnetic poles, further including an ignition circuit and third armature means with a third winding thereon excitable by said flywheel for energizing said ignition circuit, said first, second and third armature means comprising three orthogonally related laminated cores each terminating in a pair of pole shoes, the pole shoes of said second armature means overlapping, respectively, an adjoining pole shoe of said first armature means and an adjoining pole shoe of said third armature means.

References Cited

UNITED STATES PATENTS 2,066,123    12/1936    Qua      322—93
3,029,378    4/1962    Carlsson      322—90

FOREIGN PATENTS 91,976    10/1961    Denmark.
922,970    4/1963    Great Britain.

ORIS L. RADER, *Primary Examiner.*

T. J. MADDEN, W. E. DUNCANSON,
*Assistant Examiners.*